Figure 3:
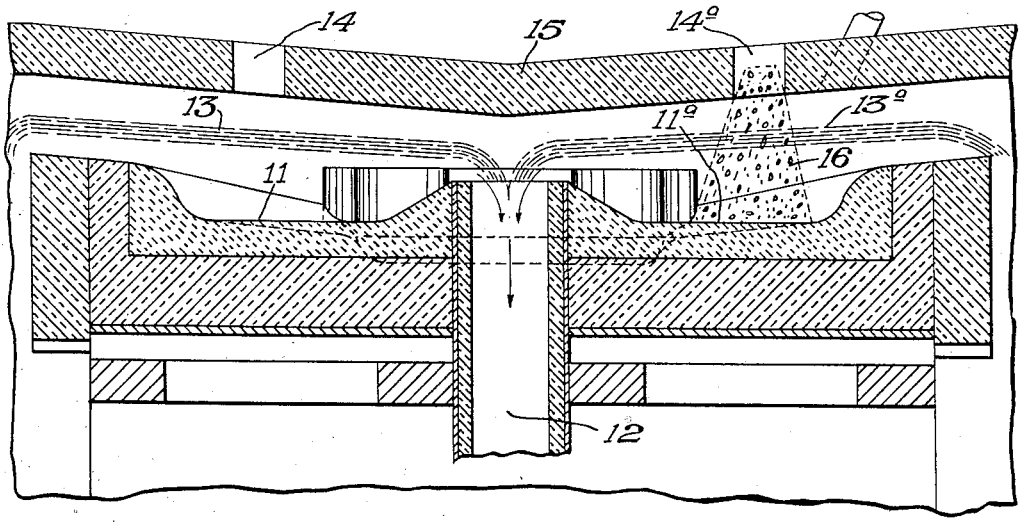

May 21, 1935.  G. E. HILLIARD  2,002,010
METHOD OF AND APPARATUS FOR TREATING METALS
Original Filed Feb. 17, 1931   2 Sheets-Sheet 1
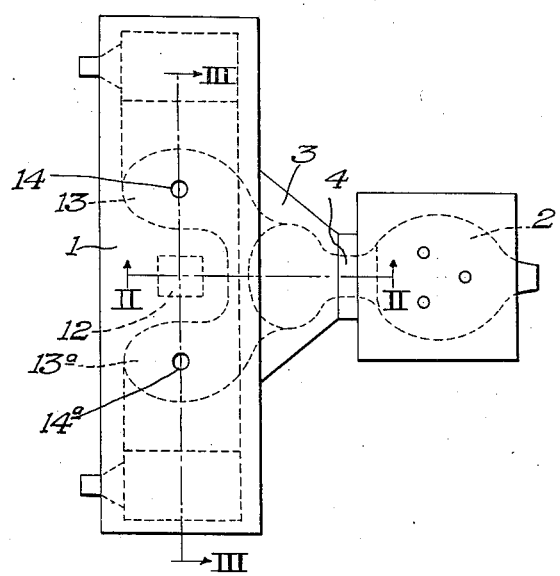
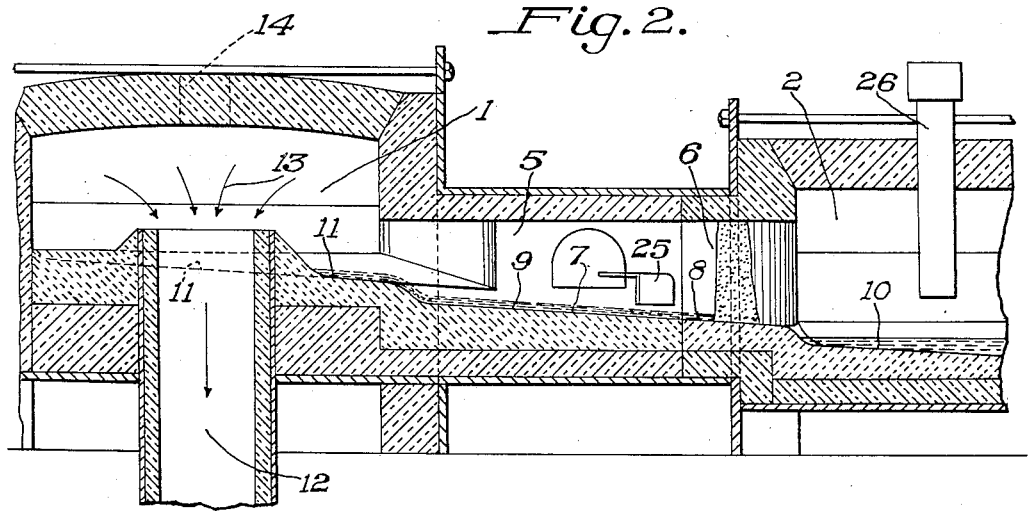
INVENTOR
Glenn E. Hilliard,
By Archworth Martin,
Attorney.

May 21, 1935.   G. E. HILLIARD   2,002,010
METHOD OF AND APPARATUS FOR TREATING METALS
Original Filed Feb. 17, 1931   2 Sheets-Sheet 2

INVENTOR
Glenn E. Hilliard,
By Archworth Martin,
Attorney.

Patented May 21, 1935

2,002,010

UNITED STATES PATENT OFFICE 2,002,010

METHOD OF AND APPARATUS FOR TREATING METALS

Glenn E. Hilliard, Brackenridge, Pa.

Application February 17, 1931, Serial No. 516,349
Renewed October 11, 1934

18 Claims. (Cl. 75—22.5)

This invention relates to an improved method of and means for melting and refining scrap to produce steel, and particularly relates to a method of producing electrically refined quality steel from an all-metal scrap metallic charge.

The invention is particularly designed for the utilization of the so-called lighter types of steel scrap such as lathe turnings, chips, stampings, sheet trimmings and the like, but modifications of the method and means are also susceptible to other uses.

Ordinarily, when utilizing steel scrap in steel melting operations, it is the well-known general custom to employ the steel scrap in conjunction with pig iron, thereby working what is known as a "pig and scrap" process. However, due to well-defined reasons, there are many localities where pig iron is an expensive item while a comparatively cheap steel scrap supply is available in great abundance. For that reason a satisfactory process whereby quality steel can be produced from an all steel scrap charge is of great economic value.

Heretofore, attempts have been made to work an all-steel scrap charge by the open hearth furnace method, however, these attempts have met with indifferent success for a number of reasons. In such practice, the charging of the light scrap has usually been by bulk methods thereby resulting in a slow melting rate with resultant high melting costs and low tonnage output from a given unit. Further, due to furnace atmosphere common to open hearth practice, it has been difficult under such methods to prevent excessive oxidation of the metal during the melting down of the charge and since the evils thereof are never subsequently wholly overcome, the result is a product of inferior quality.

On the other hand, the electric furnace offers a satisfactory apparatus to produce quality steel from an all-steel scrap charge, however, the high melting costs and low tonnage output incidental to normal electric furnace operation as now practised is such as to prohibit the employment of such apparatus for producing ordinary grades of steel but is rather more or less restricted to the production of alloys which bring a price in keeping with the excessive operating costs.

One object of my invention is to provide a method whereby good quality steel can be produced from an all-steel scrap charge cheaply, and in quantity.

Another object of my invention is to provide a method and apparatus whereby steel of electrically refined quality can be produced from an all-steel scrap charge at a cost less than heretofore possible.

Still another object of my invention is to provide a method which improves generally the utilization of steel scrap in steel melting operations.

My invention, broadly stated, consists in charging a mixture of steel scrap and carbon preferably pre-mixed and of predetermined quantitative proportions, to a specially constructed melting hearth heated by means of gaseous or liquid fuel, therein causing the melting metal to become alloyed with carbon, then removing therefrom any excess carbon so attained, as well as other oxidizable impurities, by means of an oxidizing reagent, thereafter transferring the molten scrap to a refining hearth that is preferably electrically heated, and therein superheating and refining to produce quality steel.

In the following description of my invention, I describe the preferred embodiments of apparatus I use in the practice of the process; however, it will be apparent to those skilled in the art that further modifications thereof may be successfully employed in working the process and it is understood that such are intended to come within the scope of this invention.

The advantages which obtain through utilizing a combination unit such as I have adopted to provide proper environment essential to successfully treating an all steel scrap charge become obvious. Melting in the first hearth with a comparatively cheap fuel, of a gaseous or liquid nature, the conversion of the solid scrap to the liquid state is accomplished very cheaply. Particularly will this become apparent as the description of the process proceeds, showing how exceptionally favorable conditions are provided and maintained to bring about speedy and practically continuous melting rate. Finishing and shaping up the molten scrap as quality steel under the influence of electric heating means is accomplished very quickly in the second hearth, with an exceptionally low power consumption per ton of metal treated. Consequently, the composite fuel cost is kept reasonably low and, due to maintaining a practically continuous melt in one hearth and the refining in another, the unit is capable of producing large quantities of electric furnace quality steel cheaply. Indeed, I have found it possible to produce steel by this method for purposes such as sheet bar stock, stamping and deep draw stock, strip mill stock and the like, at a cost to compare favorably with ordinary open hearth steels.

Figure 4:
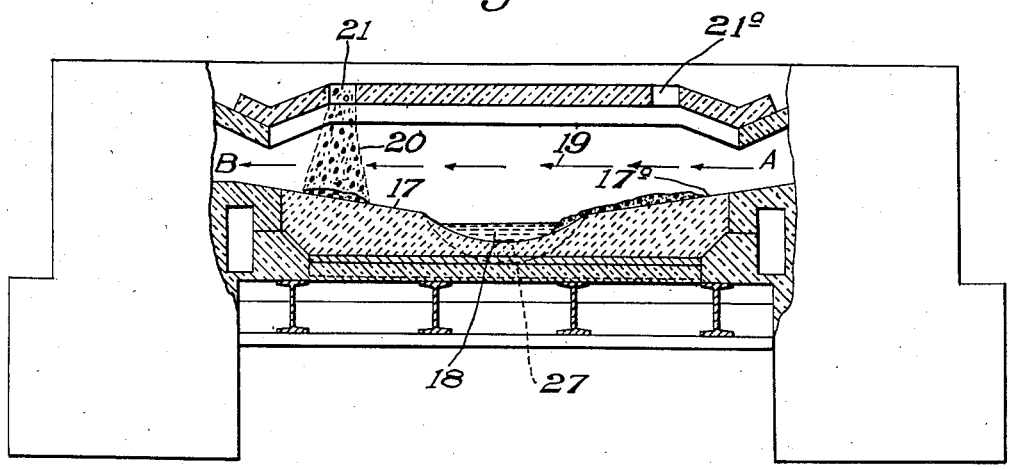

Referring to the accompanying drawings, Figure 1 is a plan view which shows diagrammatically the positions of the hearths; Fig. 2 is a fragmentary sectional view taken on the line II—II of Fig. 1; Fig. 3 is a longitudinal sectional view of the melting hearth, taken on the line III—III of Fig. 1; Fig. 4 is a longitudinal sectional view, similar to that of Fig. 3, but showing a modification thereof.

Referring further to the drawings, 1 denotes a melting hearth heated by means of gaseous or liquid fuel whereinto the charge is fed and melted, 2 a refining furnace electrically heated wherein the metal received from the melting hearth is superheated and refined, 3 a lateral extension of the melting hearth wherein molten scrap from the melting hearth is accumulated if desirable and subjected to a preliminary period of refinement during the stage of accumulation, and 4 a further extension of the section 3 which joins the refining furnace and whereby the flow of metal from the melting hearth to the refining hearth is continuously or intermittently controlled. When the process is worked as a continuous flow of metal to the refining hearth, I prefer the extension 4 to be a solid joining member, whereas, I prefer it to be removable if the process is so worked that metal is drained to the refining hearth at intermittent periods.

With reference to Fig. 2, the numeral 5 represents the sidewall of the hearth extension at 3, 6, the sidewall of the refining hearth, these side walls being provided with openings through which the molten metal may flow from the furnace 1 to the hearth floor 10 of the refining furnace 2, along the sloping extension 7 of the hearth floor extension 3 and the sloping floor 8 of the extension 4, while 9 indicates the flowing metal.

Fig. 3 represents a novel and preferred construction of the melting hearth, wherein 11 and 11a denote the floor of the melting hearth, and 12 a center draft flue to draw off the waste gases. The arrows 13 and 13a indicate the paths of the flames which are maintained continuously and simultaneously, entering from opposite ends of the furnace and after each has traversed a given portion of the hearth, they converge and their products of combustion drawn off by way of the passageway 12. After passing from the furnace chamber by way of the draft flue 12, the waste gases are made to pass through preheaters of various well-known forms (not shown) to preheat the volume of air introduced to promote combustion. Charging ports 14 and 14a are located in the roof 15, and a stream 16 of material consisting of an intimate mixture of steel scrap and fine carbon is introduced to the hearths 11 and 11a by way of the charging ports 14 and 14a alternately or simultaneously, as desired.

In the following description of the practice of my invention, I shall first describe the manner in which I employ a combination unit as shown in Fig. 1, with a melting hearth construction as shown in Fig. 3, to practice the process.

When utilizing light scrap, such as lathe turnings or the like, which is susceptible to prior physical reduction, I first reduce the scrap, by means of crushing, grinding and so forth, to comparatively small pieces and thus facilitate a stream-flow form of charging. This physical reduction, while not absolutely essential, not only permits stream charging of the metal, but also insures a more intimate mix of fine carbon, which I introduce simultaneously with and as a part of the charge stream and which is changed to carbon monoxide by the heat in the furnace to produce a reducing atmosphere which protects the metallic scrap as the charge stream passes through the furnace flame.

By employing suitable mechanism to effect entry of the stream through the charging port, I effect proper diffusion of the stream, with resultant desirable distribution of the scrap particles over the area of the melting elevation to which the stream is directed, and a proper proportion of metal surface to mass thereof is exposed to the action of the flame to obtain an exceptionally favorable melting rate, as compared to those processes wherein the scrap is dumped into the furnace as a mass or in bulk.

I further provide an independent stream of somewhat coarser carbon which is made to fall on the melting elevation simultaneously with the accumulating scrap particles, thereby obtaining an accumulation of metal and carbon in intimate relation on said melting elevation. Upon becoming melted the molten scrap is thereby alloyed with carbon, and by regulating the input of this carbon supply proportionately to the rate of said scrap input almost any content of carbon in the molten metal can be obtained.

While I prefer to introduce this coarser carbon in the form of an independent stream from the main charge stream, it is just as acceptable to mix this quantity of coarser carbon with the charge stream and so introduce it as a part thereof. In the latter case, the coarser carbon will not be materially affected during the passage of the stream through the furnace flame and will, therefore, fall and accumulate as a mixture with the scrap on the melting elevation.

Proceeding with the description, I charge the mixture of scrap and fine carbon by way of ports 14 or 14a, to the melting elevations of the hearth 11 or 11a, respectively. The charging thereof is always at a predetermined rate of flow to conform with melting area and fuel supply available. Suitable mechanism of varied means to control the rate of flow is a simple matter of mechanics and is no part of this invention and, therefore, requires no explanation in this specification. Fine carbon, such as coke or any suitable carbonaceous substance, is mixed with the scrap in such volume proportionately that sufficient carbon is supplied that its product of combustion (CO) will create a gaseous atmosphere of sufficient volume to substantially envelop the metal scrap particles while the charge stream is in contact with the furnace flames during movement to charged position on the melting hearth. This gaseous atmosphere being of a reducing nature, the scrap is thereby protected from becoming extensively oxidized by action of the furnace gases and thus makes for a satisfactory yield on metal charged.

Hitherto, the chief deterrent to obtaining a high quality product from the working of an all-steel scrap charge in furnaces of a character ordinarily used in steel melting operations has been that the matter of high flame temperature necessary to accelerate the melting rate to a satisfactory degree results in the atmosphere of the combustion chamber thereof being decidedly oxidizing in character.

Not only are certain constituents of the flame itself oxidizing in effect but, due to the common method of fuel and air introduction to the firing port, there is generally an excess of air in quite free expansion present as a component of the atmosphere as a whole.

Steel scrap, unlike cast iron scrap and the like, usually has a comparatively low content of metalloid residuals, or the like, which can act as reducing agents; therefore, a charge of steel scrap exposed to the oxidizing atmosphere, common to the melting furnace, will be subjected to extensive oxidation thereby resulting in a considerable metal loss as well as impairment of quality of the product because the melting metal will be literally saturated with oxid of iron resulting of such oxidation. This condition of over oxidation of the metal is difficult to overcome in refining for quality product even though recourse is made to subsequent extensive treatment by means of deoxidizing reagents.

To those familiar with the art, it will be obvious that in the practice of my method of melting steel scrap, I have provided a novel and reliable means for protection of the metal from over-oxidation in contact with such furnace atmosphere. By means of widely marketed graphic instruments which chart the ratios of air and fuel input, plus means for analyzing the constituents of the furnace atmosphere, one is able to determine the extent of the oxidizing influence which exists. Once the matter of furnace atmosphere is checked to a known quantity, I calculate the metallic surface area of my charge stream and then regulate the fine carbon input therewith to an amount sufficient that only CO gas will be generated in contact with said furnace atmosphere.

I find this a reliable method of charging the scrap to insure prevention of over oxidation thereof, and further find it extraordinarily reliable as a practical method to be followed day in and day out in actual melting practice, because once the definite status of furnace atmosphere, scrap surface area of input, and carbon input necessary to meet the conditions of a given unit is established, it is comparatively simple to set up and regulate all items as standard ratios to be followed out in the operation of said unit.

The flow of the charge stream of scrap and fine carbon should, in ordinary cases, enter the furnace atmosphere as an intimate mixture, because the purpose is to create this CO gas only in proximity to the scrap surface, to envelop said scrap as a protective agent during movement of the scrap through said atmosphere to charge position on the hearth. There are instances, however, where a furnace is run under forced draft, such as by use of an induction fan to create a strongly positive force to the air input, with the result that a somewhat positive pressure condition exists to the firing port and extends its influence even to the combustion chamber, and it may be necessary to modify the method of charge introduction somewhat to meet such conditions. It is best, in such circumstances, to lower the input of fine carbon as a mixture with the charge stream and introduce the balance of said carbon to meet requirements by way of a separate port located at a forward position to the main charging port with regard to direction of movement of furnace atmosphere, so that the CO gas generated by such introduction would be carried to the main charge stream, thereby affording further assurance that the scrap thereof is properly enveloped for adequate protection.

In any event, the purpose is to maintain a flow of scrap somewhat in stream form to the furnace and having said scrap move through the furnace atmosphere, to charged position of the hearth, as a stream of scrap protected by an enveloping gaseous atmosphere as described, and any slight modifications in the matter of charging necessary to meet requirements of a given furnace are intended to come within the spirit of this invention.

During the period of the scrap movement, the metal will absorb some carbon from the CO gas, but the rate of such absorption will not be sufficient to materially affect the residual carbon of the melted scrap.

The melting hearth of Figs. 1 and 3 is so constructed that two melting flames 13 and 13a are continuously and simultaneously maintained. It is well known that a flame of high intensity is most efficient in melting such material as solid scrap and this hearth construction has been so arranged, by localizing the melting areas to conform thereto, that it is possible to maintain these two flames of comparatively high intensity to the one furnace combustion chamber. As a consequence, a furnace hearth of this construction having two distinct simultaneous melting zones constantly heated by individual flames of proper type results in an exceptionally high melting rate, with resultant quantity production of high melting ratio, comparatively, per square foot of hearth area involved.

Furthermore, since these flames are maintained to the hearth continuously there is avoided the undesirable condition of momentarily cooling the furnace at frequent intervals such as accompanies reversals in the operation of a regenerative furnace.

And, further still, the preheating of the incoming volume of air introduced to promote combustion, being by means of the recuperative method, the temperature of such preheated air remains substantially constant, thereby providing means to maintain flames of more or less balanced intensity over sustained periods of time. Those familiar with the subject will instantly recognize the value of this with regard to flame efficiency in melting operations.

The two melting flames as described, can be of different character, the flame which is preheating the scrap during the period of introduction being a reducing flame to avoid the oxidation of the scrap, and the flame which is passing over the conglomerate on the other hearth surface functioning as a melting or cutting flame which is usually more or less oxidizing in character. The characteristics of these two flames will, of course, be reversed with change in point of scrap entry. That is, a reducing flame will always be passing the point of scrap entry, and a melting flame passing the other hearth elevation.

I prefer to charge the stream through only one charging port at a time. For example, I charge for a given length of time through the port 14 to the hearth elevation 11, through flame 13, and the metal becomes heated almost to melting temperature as fast as it accumulates on the elevation 11. At a given time I stop entry of the charge stream at this point and immediately commence to charge to the elevation 11a, through flame 13a, by way of the port 14a. Under some conditions, it will be found desirable to introduce the scrap at such rate of speed that it is heated as closely as possible to melting temperatures before it reaches the hearth surface.

While a charge is being introduced and being heated nearly to melting temperature on elevation 11a, the previously-charged scrap on elevation 11 is being rapidly melted by flame 13. The molten scrap so obtained immediately drains from the said elevation to the laterally positioned extension 3.

The floors of the elevations 11 and 11a are sloped downward laterally sufficiently to cause the melted scrap to flow therefrom by gravity. The floor of the extension 3 is placed at a lower level than the said elevations, to receive the flow of molten metal therefrom and is constructed to form a basin-like reservoir wherein the molten metal may be temporarily accumulated and subjected to a preliminary refining treatment when desired.

This hearth basin 3 is formed to a narrow neck-like outlet at the junction with the extension 4 and by closing this neck-like outlet with a suitable material, such as dolomite or the like, the flow of metal from this basin-like reservoir 3 can be stopped at any time. Even when working the process by a substantially continuous flow of metal from hearth 1 throughout to hearth 2, it will be necessary to stop the flow temporarily by such means while the refined bath of metal is being tapped from hearth 2. However, in any event, it is not necessary to interrupt the melting of the scrap in hearth 1, since the molten scrap therefrom is permitted to accumulate in the extension reservoir 3 until the hearth 2 is again ready to receive the flow of metal.

Steel scrap is usually comparatively low in carbon content and upon becoming melted, the resultant molten metal would ordinarily be too low in carbon to meet the usual technical requirements. The purpose of mixing the carbon with the scrap at the elevations 11 and 11a is to cause the melting scrap to absorb carbon and thereby attain a flow of molten metal alloyed with carbon. It will be apparent that providing for an intimate mix of scrap particles and carbonaceous substance at this point, as described, the matter of resultant carbon content of the molten metal can be very closely controlled.

This intimate association of the scrap with the carbon while being subjected to the melting action of the flame also prevents the scrap from becoming excessively oxidized by reason of the action of said flame during the process of its conversion to the liquid state.

I find it substantially economical to supply carbon at this point on the melting elevation, in the manner described, in excess of actual requirements and thereby secure a molten metal higher in carbon content than the final specification calls for. By reason of such practice, I obtain a comparatively faster melting rate than if only sufficient carbon to meet ordinary requirements is added.

Such practice is particularly desirable when the process is worked in an intermittent manner with regard to transfer of molten scrap to the refining hearth 2. In this case, I accumulate the molten scrap, containing excess carbon, from the elevations 11 or 11a, in the reservoir 3 and I find it comparatively simple to immediately remove this excess carbon therefrom by adding to the accumulating bath of carbonized scrap an oxidizing reagent such as fine ore, scale or the like in quantities sufficient to remove the excess carbon. In fact, what constitutes a more or less preliminary refining treatment can be carried out at this point, and without materially interrupting the continuity of the process, since the oxidizing reagent added to remove the excess carbon will also act on and remove other oxidizable impurities from the bath of metal. Proper slag facilitates therefor can easily be provided and a slag skimmer 25 will prevent such slag from entering the refining hearth 2.

In some instances it may be desirable to further enlarge the treatment of the bath at this stage, before draining the metal from the reservoir 3, by adding thereto certain ingredients necessary to meet final requirements.

After the bath has been treated to the desired extent in the reservoir 3, I then drain the metal to the refining hearth 2 wherein it is superheated and superrefined, preferably by means of the electric arc method, for which purpose electrodes 26 are provided. As is well-known, the quality of the product can be improved, with regard to the elimination of certain impurities, non-metallic inclusions and the like, if the metal is finally treated under the influence of an electric heating medium.

My process has been devised to permit of finally treating the metal in an electrically-heated hearth at a composite producing cost low enough to allow the production of electrically refined quality steel for a wider field commercially. Assuming that the metal, upon leaving the reservoir 3 has a heat content of 550 to 575 B. t. u. per pound, there remains to be supplied only a comparatively small amount of heat in the electric hearth to raise the metal to proper casting temperature. Delivering the metal to the electric hearth with such a heat content, plus the practically constant conditions which are maintained therein, permits the electric superheating of the metal to be accomplished with minimum power consumption.

When working to plain carbon steel specifications, or the like, it is but necessary to cover the bath of metal in the electric hearth with the proper type cleansing slag and the cleansing of the bath proceeds while the temperature is being raised. The treatment of the bath at this stage may be extended to include the addition of an alloy, or alloys, to produce high grade alloy steels.

While I have described the manner in which I practice my process in a combination unit having a melting hearth structure as shown in Fig. 3, it will be understood that this is but one of several types of melting hearth structure which are equally acceptable in which to carry out the steps of the process.

A modified hearth structure such as is shown in Fig. 4, may be employed to work the process. In fact, such a modification is particularly desirable, because steel works in general have in operation melting furnaces which, for a nominal expenditure, can be modified to this design and used to work my process thereby avoiding the expense of constructing an entirely new furnace. It will be necessary, of course, to add the second hearth 2 to complete the combination unit as shown in Fig. 1.

The hearth floor of this furnace is so constructed that it comprises two melting elevations 17 and 17a which slope from the ends thereof towards the center, as shown, and then is made to dip, forming a shallow depression 18 which extends laterally the width of said hearth and acts as a reservoir wherein the metal flows and accumulates from the sloping elevations 17 and 17a. The total of the entire hearth area which is elevated as melting area and the area which is at a lower level to act as a reservoir, is determined by the quantity of metal it is desired to accumulate in the reservoir. However, I have found that about 65% to 70% of the total area should be allotted as melting elevations and the remaining 30% to 35% suffices as a reservoir.

I wish to point out that a distinct advantage is found in melting scrap on elevations, as described (see Fig. 4), by reason of the fact that the molten increments therefrom are immediately removed from the vicinity of the colder scrap and, subsequently accumulating as a separate dominant pool, are not only more easily kept in the molten condition, but are more readily susceptible of refinement than under ordinary methods of melting as now practiced.

In the practice of the process in conjunction with the hearth structure as shown in Fig. 4, the steps involved are substantially the same as described in connection with the hearth shown in Fig. 3. I maintain the charge stream 20 of scrap and carbon, in the manner previously described, to the hearth elevations 17 or 17a by way of ports 21 or 21a alternately, or, simultaneously if desired. I find it best to proceed somewhat as follows.

I introduce the charge stream to hearth elevation 17 by way of port 21 while the flame 19 is entering the melting chamber at the end designated as A and after passing over the hearth makes its exit at the end designated as B. I maintain the charge stream to this elevation 17 while the flame is in this direction. The preheating of the air, or both air and fuel in some cases, being by means of regeneration, the direction of the flame will ordinarily be changed every 15 or 20 minutes and upon such reversal B becomes the entry end and A the exit end.

Upon reversing the flame, B becomes the point of entry and A the exit point, and I forthwith start the charge stream to elevation 17a by way of port 21a. The strap and carbon mixture accumulated on the elevation 17, having been heated to nearly melting temperature during the stage of accumulation, is now exposed to the hottest part of the flame body and is being rapidly melted. At the same time, the tail of the flame is preheating the charge accumulating on the elevation 17a.

Such a procedure of alternating the charge stream from elevation to elevation to conform with flame reversals permits of maintaining a substantially continuous melting operation while also maintaining a substantially continuous charging operation, both in simultaneous progress and without one materially interfering with the other. It is also obvious that a maximum utilization of heat generated is obtained.

The molten scrap, alloyed with carbon, drains to and accumulates in the depression or reservoir 18, where it is subjected to the action of an oxidizing reagent, if desirable, and then drained to refining hearth 2 wherein it is superheated and superrefined under the influence of an electric heating medium.

While still in the reservoir 18, the bath may be subjected to any necessary treatment such as adding ingredients thereto, or the like before being drained to the refining hearth. The scope of treatment in the refining hearth may include the addition of an alloy, or alloys, to produce alloy steel. A tap hole 27 is provided for controlling flow from the reservoir 18 to the refining hearth.

While I have indicated that I prefer the refining hearth 2 be electrically heated, it will be understood that the steps involved in the present invention may also include a refining hearth heated by any suitable means and such modifications are intended to come within the scope of this invention.

Various features or steps of this invention are not dependent upon the use of fine carbon, since, in its broader aspects, it involves a series of steps, such as first forming a scrap-carbon conglomerate on the hearth of a fluid fuel furnace and thereafter subjecting the molten metal to electrical refining treatment.

I claim as my invention:—

1. The method of melting steel scrap, which comprises maintaining a flow of intimately mixed steel scrap and fine carbon to a melting furnace, to form a gaseous envelope around the stream of scrap, and simultaneously maintaining an independent flow of comparatively coarser carbon which is made to mingle with the mixture and form an accumulation on the hearth of said furnace, consisting of a scrap-carbon conglomerate, thereby causing the melting scrap of said conglomerate to become alloyed with carbon.

2. In the melting and refining of steel scrap, the method which comprises maintaining a flow of steel scrap and fine carbon to a melting furnace, forming a scrap-carbon conglomerate on the hearth of said furnace, melting said conglomerate, then directing the molten material to a second hearth and therein raising the temperature of said melt while subjecting it to further refining treatment.

3. In the melting and refining of steel scrap, the method which comprises maintaining a flow of steel scrap and fine carbon to a melting furnace, forming a scrap-carbon conglomerate on the hearth of said furnace, melting said conglomerate, and then directing the molten material to a second hearth and therein adding alloy material to the molten mass while increasing the temperature thereof.

4. In the melting and refining of steel scrap, the method which comprises maintaining a flow of steel scrap and fine carbon to a melting furnace, forming a scrap-carbon conglomerate on the hearth of said furnace, melting said conglomerate, and then directing the molten material to an electrically-heated hearth and therein raising the temperature of said material, while subjecting it to further refining treatment.

5. In the manufacture of electric furnace steel, the method which comprises maintaining a flow of steel scrap and fine carbon to a melting furnace heated by means of a fluid fuel, forming a scrap-carbon conglomerate on the hearth of said furnace, melting the conglomerate, then directing the molten material to an electrically heated hearth and therein raising the temperature of said material while subjecting it to further refining treatment.

6. In the manufacture of electric furnace steel, the method which comprises maintaining a flow of steel scrap to a melting furnace heated by means of a fluid fuel, forming a scrap-carbon conglomerate on the hearth of said furnace, melting the conglomerate, removing excess carbon from the molten material, and then directing said molten material to an electrically-heated hearth and therein raising the temperature thereof while subjecting it to further refining treatment.

7. In the manufacture of electric furnace steel, the method which comprises maintaining a flow of steel scrap and fine carbon to a melting furnace heated by means of fluid fuel, forming a scrap-carbon conglomerate, melting said conglomerate, removing carbon from the molten material, and then directing said molten material to an electrically-heated hearth and therein raising the temperature thereof while subjecting it to further refining treatment.

8. In the manufacture of electric furnace steel, the method which comprises maintaining a flow of steel scrap and fine carbon to a melting furnace heated by means of fluid fuel, forming a scrap-carbon conglomerate on the hearth of said furnace, melting said conglomerate, accumulating a bath of the melt thereof, removing excess carbon from the metal of said bath by means of an oxidizing reagent, and then directing said metal to an electrically-heated hearth and therein raising the temperature of said metal while subjecting it to further refining treatment.

9. In the manufacture of electric furnace steel, the method which comprises maintaining a flow of steel scrap and fine carbon to a melting furnace heated by means of fluid fuel, forming a scrap-carbon conglomerate on the hearth of said furnace, melting said conglomerate, accumulating a bath of the melt thereof, subjecting said bath to the action of an oxidizing reagent in the presence of a cleansing slag, then directing the metal to an electrically-heated hearth and therein raising the temperature of said metal while subjecting it to further refining treatment.

10. In the manufacture of electric furnace steel, the method which comprises maintaining a flow of steel scrap and fine carbon to a melting furnace heated by means of fluid fuel, forming a scrap-carbon conglomerate on the hearth of said furnace, melting said conglomerate, accumulating a bath of the melt thereof, subjecting said bath to the action of an oxidizing reagent in the presence of a cleansing slag, introducing a modifying element into the molten bath, then directing the metal to an electrically-heated hearth and therein raising the temperature of said metal while subjecting it to further refining treatment.

11. In the melting and refining of steel scrap, the method which comprises maintaining a flow of steel scrap to a melting furnace, forming a scrap-carbon conglomerate on the hearth of said furnace, melting said conglomerate, accumulating a bath of the melt thereof, subjecting said bath to the action of an oxidizing reagent in the presence of a cleansing slag, and then directing the metal to a second hearth and therein raising the temperature of said metal while subjecting it to further refining treatment.

12. In the melting and refining of steel scrap, the method which comprises charging a mixture of steel scrap and carbon to a melting furnace, maintaining the rate of flow of said scrap and carbon thereinto in proportionate volumes thereof to form a scrap-carbon conglomerate of definite ratios on the hearth of said furnace, melting said conglomerate, and then directing the metal to a second hearth and therein raising the temperature of said metal while subjecting it to a refining treatment.

13. In the melting and refining of steel scrap, the method which comprises charging a mixture of steel scrap and carbon to a melting furnace, maintaining the rate of flow of said scrap and carbon thereinto in proportionate volumes thereof to form a scrap carbon conglomerate of definite ratios on the hearth of said furnace, melting the said conglomerate, accumulating a bath of the metal, subjecting said bath to the action of an oxidizing reagent in the presence of a cleansing slag, then directing the metal to a second hearth and therein raising the temperature of said metal while subjecting it to further refinement.

14. In the melting and refining of steel scrap, the method which comprises maintaining a flow of steel scrap to a melting furnace, forming a scrap carbon conglomerate on the hearth of said furnace, melting said conglomerate, and then directing the molten material to a second hearth and therein adding alloy material to the molten mass while increasing the temperature thereof.

15. In the melting and refining of steel scrap, the method which comprises maintaining a flow of steel scrap to a melting furnace heated by fluid fuel, forming a scrap carbon conglomerate on the hearth of said furnace, melting said conglomerate, directing the molten material to an electrically heated hearth, and there adding alloy material to the molten mass while increasing the temperature thereof.

16. The method which comprises melting a mixture of steel scrap and carbon on a hearth with carbon in excess of suitable requirements for securing the ultimate desired ratio between said scrap and said carbon, removing the excess carbon and directing the molten metal to a second hearth and there refining the same.

17. The method which comprises charging metal scrap alternately to two hearths contained in a single furnace, simultaneously passing a reducing flame over that hearth to which the metal is being charged at a given time and passing an oxidizing or cutting flame over the other hearth.

18. A method of the character described which includes the steps of alternately introducing metal scrap through two furnace openings to separate hearth surfaces located thereunder, rendering the scrap molten on said hearth surfaces, causing the molten metal to flow from both such surfaces to a single receptacle, and so treating the molten metal in said receptacle as to refine the same, wherein the rendering of the scrap molten on the separate hearth surfaces is effected by alternately introducing a flame for melting purposes over the hearths in opposite order to the charging of said hearths.

GLENN E. HILLIARD.